United States Patent
Andou et al.

(10) Patent No.: US 7,866,738 B2
(45) Date of Patent: Jan. 11, 2011

(54) VEHICLE BODY STRUCTURE

(75) Inventors: Tomotaka Andou, Yokohama (JP); Seiko Abe, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 478 days.

(21) Appl. No.: 11/822,494

(22) Filed: Jul. 6, 2007

(65) Prior Publication Data
US 2008/0007093 A1 Jan. 10, 2008

(30) Foreign Application Priority Data
Jul. 10, 2006 (JP) ............... 2006-189758

(51) Int. Cl.
*B62D 25/00* (2006.01)
(52) U.S. Cl. .............. 296/198; 296/193.05; 296/193.06
(58) Field of Classification Search ............ 296/187.01, 296/187.11, 187.12, 193.01, 193.05, 193.06, 296/198, 203.01, 205, 203.03, 203.04
See application file for complete search history.

(56) References Cited

U.S. PATENT DOCUMENTS

| | | | | |
|---|---|---|---|---|
| 4,717,197 A | * | 1/1988 | Harasaki | 296/193.05 |
| 4,875,733 A | * | 10/1989 | Chado et al. | 296/203.04 |
| 4,950,025 A | * | 8/1990 | Yoshii | 296/203.04 |
| 5,397,152 A | * | 3/1995 | Kawamura | 280/807 |
| 6,086,100 A | * | 7/2000 | Corporon et al. | 280/808 |
| 6,152,490 A | * | 11/2000 | Suzuki et al. | 280/801.1 |
| 7,467,821 B2 | * | 12/2008 | Wolkersdorfer | 296/203.04 |
| 2005/0194820 A1 | * | 9/2005 | Azzouz et al. | 296/193.05 |

FOREIGN PATENT DOCUMENTS

| | | |
|---|---|---|
| JP | 5-14946 Y2 | 4/1993 |
| JP | 8-1160 Y2 | 1/1996 |
| JP | 2001-048051 | 2/2001 |
| JP | 2004-256057 A | 9/2004 |

* cited by examiner

*Primary Examiner*—Patricia L Engle
*Assistant Examiner*—SunSurraye Westbrook
(74) *Attorney, Agent, or Firm*—Foley & Lardner LLP

(57) ABSTRACT

A vehicle body structure comprising: first and second members each having a hat-shaped cross section including a main wall, first and second side walls extending from the main wall; an opposing area in which the opening, first side wall and second side wall of the first member are opposed to and jointed to the opening, first side wall and second side wall of the second member, respectively, with a joint surface defined therebetween; and a non-opposing area in which one of the first and second members is shifted parallel to the joint surface, so that the first side wall of the first member is opposed to and jointed to the second side wall of the second member.

15 Claims, 4 Drawing Sheets

VEHICLE BODY STRUCTURE

BACKGROUND OF THE INVENTION

1. Field of the Invention

The present invention relates to a vehicle body structure.

2. Description of the Related Art

Japanese Patent No. 3659077 discloses a rear vehicle body structure in which a lower end portion of a rear pillar is extended to a vicinity of an upper portion of a wheel house, and a brace member and a reinforcement member are used to increase the efficiency of absorbing the load from a shock absorber.

SUMMARY OF THE INVENTION

A rear door lock apparatus is arranged adjacent to and in front of an outer reinforcement member of a rear pillar. This makes it difficult to get a large closed section of the reinforcement member, and hinders improvement in efficiency of absorbing the input load.

A source of this kind of problem is not limited to the arrangement of the rear door lock apparatus. A similar problem is likely to take place in a case where the vehicle has a restriction on a rear pillar layout, such as a case where another part/equipment is located in a vicinity of the rear pillar.

An object of the present invention is to provide a vehicle body structure capable of securing strength and rigidity of a vehicle body structural member, and of securing a sufficiently large area/space for each of parts/equipment to be arranged in a vicinity of the vehicle body structural member.

Another object of the present invention is to provide a rear vehicle body structure in which a lower end portion of a pillar is extended to an upper portion of the wheel house, the structure enabling the pillar to efficiently absorb the load inputted from a shock absorber.

A first aspect of the present invention is a vehicle body structure comprising a first member, a second member, an opposing area and a non-opposing area. The first member includes a main wall, a first side wall on one side of the first member, and a second side wall on the other side of the first member, the first and second side walls extending from the main wall. The first member has a hat-shaped cross section open in a direction away from the main wall. The second member includes a main wall, a first side wall on one side of the second member, and a second side wall on the other side of the second member, the first and second side walls extending from the main wall. The second member has a hat-shaped cross section open in a direction away from the main wall. In the opposing area, the opening, first side wall and second side wall of the first member are opposed to and jointed to the opening, first side wall and second side wall of the second member, respectively, with a joint surface defined therebetween. In the non-opposing area, one of the first and second members is shifted in a direction substantially parallel to the joint surface, and the first side wall of the first member is opposed to and jointed to the second side wall of the second member.

This structure makes it possible to secure strength and rigidity of a vehicle body structural member constituted of the first and second members in the respective opposing and non-opposing areas, and concurrently secure an area/space for arranging each of parts and the like in the vicinity of the vehicle body structural member.

A second aspect of the present invention is a rear vehicle body structure including: a wheel house having a wheel house outer and a wheel house inner; and a rear pillar extended to the wheel house. The rear pillar includes: an outer member having a hat-shaped cross section open toward the inside of a vehicle compartment; and an inner member having a hat-shaped cross section open toward the outside of the vehicle compartment, with a joint surface defined between the outer and inner members. In the rear vehicle body structure, one of lower portions of the respective outer and inner members is shifted in a direction substantially parallel to the joint surface, and a front portion of the shifted one of the lower portions is butt-jointed to a rear portion of the other of the lower portions. Moreover, in the rear vehicle body structure, a lower end of the inner member is connected to a shock absorber upper supporting part provided on the wheel house inner for supporting an upper portion of a shock absorber.

According to this structure, the pillar can efficiently absorb the load inputted from the shock absorber.

BRIEF DESCRIPTION OF THE DRAWINGS

The invention will now be described with reference to the accompanying drawings wherein.

DESCRIPTION OF THE PREFERRED EMBODIMENTS

Figure 1:
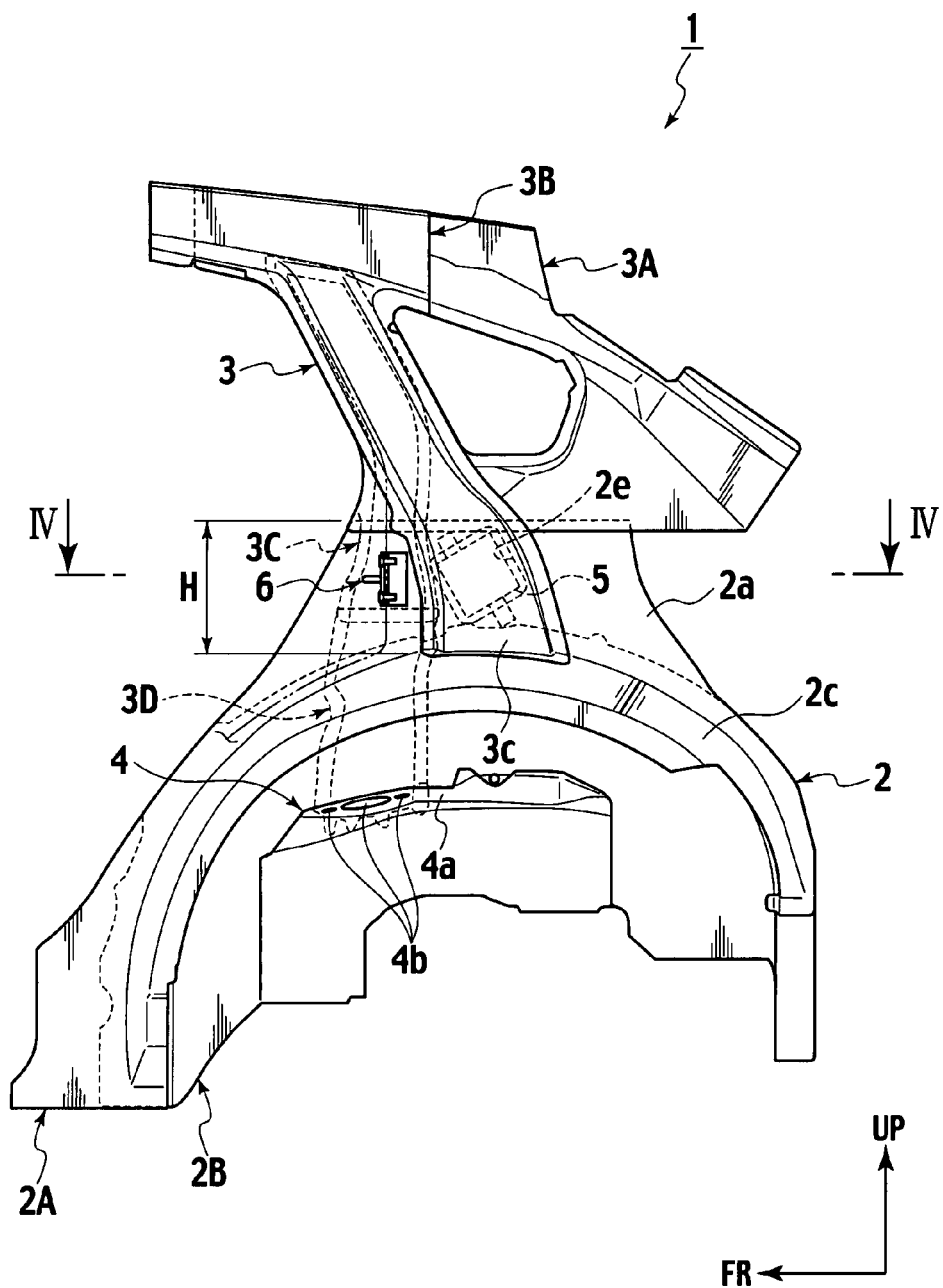
FIG. 1 shows a vehicle body structure according to an embodiment of the present invention, viewed from the outside of a vehicle compartment.

Detailed descriptions will be hereinafter provided for an embodiment of the present invention by referring to the drawings. In the drawings, it should be noted that FR denotes forward in the longitudinal direction of the vehicle; IN, toward the inside of the vehicle compartment in the vehicle transverse direction; and UP, upward.

Figure 2:
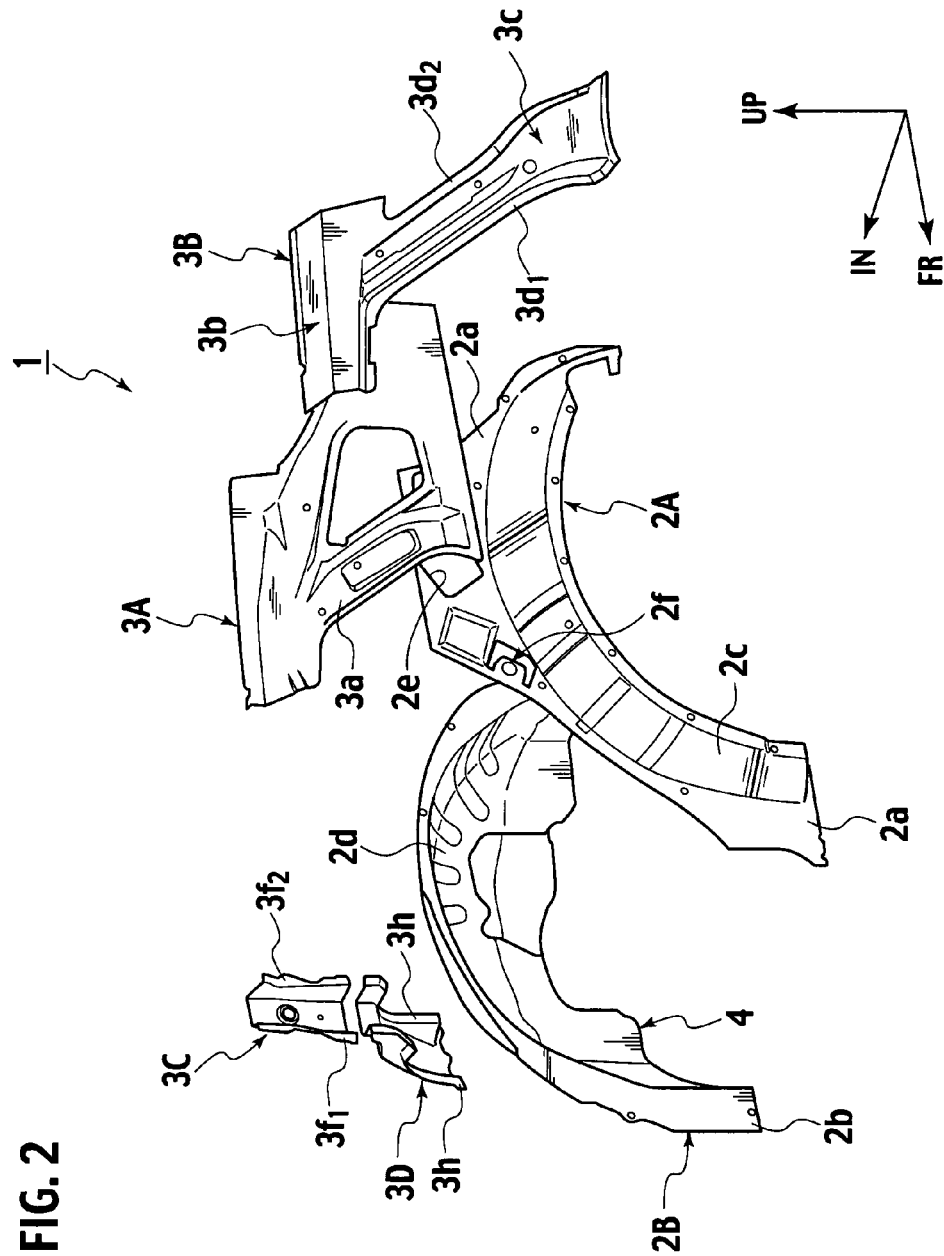
FIG. 2 is an exploded perspective view of the vehicle body structure according to the embodiment of the present invention.

In a vehicle body structure 1 according to an embodiment of the present invention, a lower end portion of a rear pillar 3 is extended to an upper portion of a wheel house 2, as shown in FIGS. 1 and 2. The wheel house 2 includes a wheel house outer 2A and a wheel house inner 2B. The rear pillar 3 includes a rear pillar inner 3A, a rear pillar outer reinforcement 3B, a rear pillar inner reinforcement 3C, and an inner extension 3D.

The wheel house 2 is constructed by butt-welding a joint flange 2a of the wheel house outer 2A and a joint flange 2b of the wheel house inner 2B to each other. In the wheel house 2, cover portions 2c and 2d each having an arch-shaped cross section cover a rear tire (not illustrated) from above.

A substantially central portion of the wheel house inner 2B in the vehicle longitudinal direction is formed to bulge toward the inside of a vehicle compartment. A shock absorber upper supporting part 4 for supporting an upper portion of a shock absorber (not illustrated) of a rear suspension mechanism is formed in the substantially central portion of the wheel house inner 2B. Installation holes 4b are formed in an upper wall 4a of the shock absorber upper supporting part 4. The upper portion of the shock absorber is fixed to the upper wall 4a by use of bolts and the like which penetrate through the respective installation holes 4b.

The rear pillar inner 3A includes a part constituting an upper portion of a C pillar and a part constituting an upper portion of a rear end of a side of the vehicle (including a D pillar) in an integral manner. The rear pillar inner 3A is formed in a shape of "D" when viewed from the side. A front oblique portion 3a extending diagonally from upper front to lower rear is formed to bulge toward the inside of the vehicle compartment. The front oblique portion 3a includes: a main wall on the inner side of the vehicle compartment; a front wall extending from a front edge of the main wall toward the outside of the vehicle compartment; and a rear wall extending from a rear edge of the main wall toward the outside of the vehicle compartment. The front oblique portion 3a thus has a hat-shaped cross section open to the outside of the vehicle compartment. The front oblique portion 3a functions as an intra-cross-section reinforcement member for reinforcing the rear pillar 3 (the C pillar).

The rear pillar outer reinforcement 3B includes: an upper end portion 3b extending substantially horizontally in the vehicle longitudinal direction; a oblique portion 3c extending diagonally from a substantially central portion of the upper end portion 3b in the vehicle longitudinal direction toward the lower rear. The rear pillar outer reinforcement 3B is formed in a shape of "T" when viewed from the side. The oblique portion 3c is formed to bulge toward the outside of the vehicle compartment. The oblique portion 3c includes: a main wall located on the outer side of the vehicle compartment (or on the outer side in a vehicle transverse direction); a front wall extending from a front edge of the main wall toward the inside of the vehicle compartment; and a rear wall extending from a rear edge of the main wall toward the inside of the vehicle compartment. The oblique portion 3c has a hat-shaped cross section open to the inside of the vehicle compartment. The oblique portion 3c functions as an outer member (a first member) of the rear pillar 3 (the C pillar). In addition, the front wall of the oblique portion 3c is provided, on an edge thereof on the inner side of the vehicle compartment (or on the inner side in the vehicle transverse direction), with a front joint flange $3d_1$ extending forward from the edge. The rear wall of the oblique portion 3c is provided on an edge thereof on the inner side of the vehicle compartment (or on the inner side in the vehicle transverse direction), with a rear joint flange $3d_2$ extending rearward from the edge.

The rear pillar inner reinforcement 3C is formed to bulge toward the inside of the vehicle compartment, and includes: a main wall located on the inner side of the vehicle compartment (or on the inner side in the vehicle transverse direction); a front wall extending from a front edge of the main wall toward the outside of the vehicle compartment; and a rear wall extending from a rear edge of the main wall toward the outside of the vehicle compartment. The rear pillar inner reinforcement 3C has a hat-shaped cross section open to the outside of the vehicle compartment, and functions as an inner member (a second member) of the rear pillar 3 (the C pillar). The front wall of the rear pillar inner reinforcement 3C is provided on an edge thereof on the outer side of the vehicle compartment (or on the outer side in the vehicle transverse direction), with a front joint flange $3f_1$ extending forward from the edge. The rear wall of the rear pillar inner reinforcement 3C is provided on an edge thereof on the outer side of the vehicle compartment (or on the outer side in the vehicle transverse direction), with a rear joint flange $3f_2$ extending rearward from the edge.

As shown in FIG. 1, a section of the rear pillar inner reinforcement 3C from its upper end portion to its central portion extends diagonally from the upper front to the lower rear while the section is side-by-side with the front oblique portion 3a of the rear pillar inner 3A and the oblique portion 3c of the rear pillar outer reinforcement 3B in the vehicle transverse direction (to put it the other way, the section overlaps the front oblique portion 3a and the oblique portion 3c when projected in the vehicle transverse direction). Starting in its central portion, the rear pillar inner reinforcement 3C curves toward the front of the vehicle, and resultantly a section of the rear pillar inner reinforcement 3C from its central portion to its lower end portion extends substantially in the vertical direction.

In the upper area from this upper end portion to this central portion (hereinafter referred to as an "opposing area"), the rear pillar outer reinforcement 3B (the oblique portion 3c) and the rear pillar inner reinforcement 3C are joined to each other with the opening, front wall and rear wall of the rear pillar outer reinforcement 3B opposed respectively to the opening, front wall and rear wall of the rear pillar inner reinforcement 3C. In the opposing area, the joint flanges $3d_1$ and $3d_2$ of the rear pillar outer reinforcement 3B are jointed respectively to the joint flanges $3f_1$ and $3f_2$ of the rear pillar inner reinforcement 3C with the rear pillar inner 3A interposed in between, and the rear pillar 3 (the C pillar) is formed to have a closed section.

Figure 3:
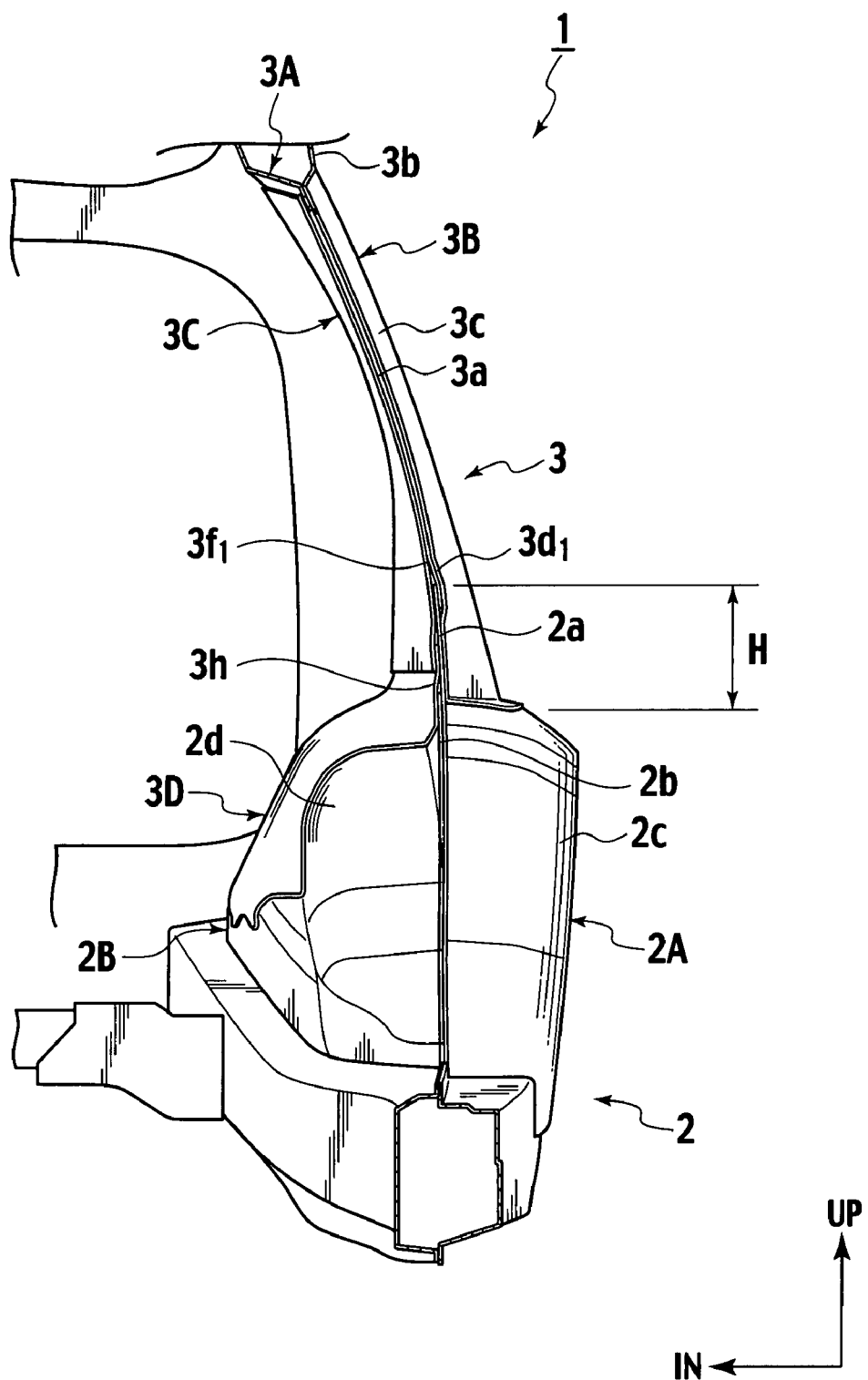
FIG. 3 is a partially-cross-sectioned front view of the vehicle body structure according to the embodiment of the present invention, viewed from the front of the vehicle.
Figure 4:
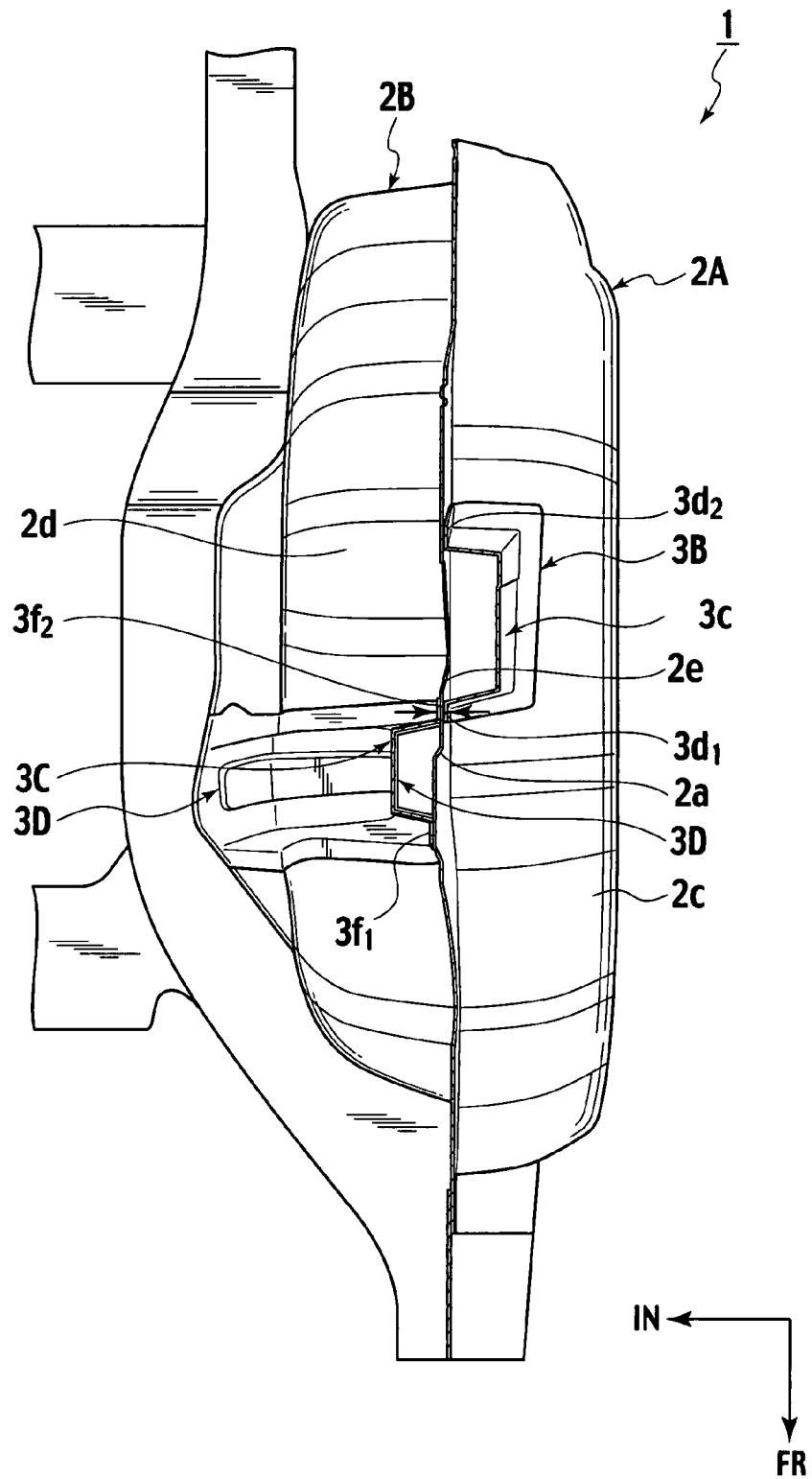
FIG. 4 is a cross-sectional view of the vehicle structure taken along the IV-IV line of FIG. 1.

On the other hand, in an area H lower than the central portion of the rear pillar inner reinforcement 3C, a rear portion of the rear pillar inner reinforcement 3C is side-by-side with a front portion of the rear pillar outer reinforcement 3B in the vehicle transverse direction (to put it the other way, the rear portion of the rear pillar inner reinforcement 3C overlaps the front portion of the rear pillar outer reinforcement 3B when projected in the vehicle transverse direction), as shown in FIGS. 1 and 3. In addition, the rear joint flange $3f_2$ of the rear pillar inner reinforcement 3C and the front joint flange $3d_1$ of the rear pillar outer reinforcement 3B are butt-jointed to each other, by spot welding, as shown in FIG. 4 (as indicated by arrows in FIG. 4).

In this area H (hereinafter referred to as a "non-opposing area"), the rear pillar outer reinforcement 3B and the rear pillar inner reinforcement 3C are both jointed to an upwardly-extending portion of the joint flange 2a of the wheel house outer 2A. The rear pillar outer reinforcement 3B forms a closed section together with the upwardly-extending portion of the joint flange 2a. The rear pillar inner reinforcement 3C also forms a closed section together with the upwardly-extending portion of the joint flange 2a. The rear pillar outer reinforcement 3B and the rear pillar inner reinforcement 3C are shifted from each other in a direction (the vehicle longitudinal direction in the case of the present embodiment) substantially parallel to a joint surface on which the rear pillar outer reinforcement 3B is jointed to the upwardly-extending portion and a joint surface on which the rear pillar inner reinforcement 3C is jointed to the upwardly-extending portion. As result, the two closed sections are shifted from each other in the vehicle longitudinal direction. The joint surface may be represented by a surface defined between the side surfaces of the upwardly-extending portion of the joint flange 2a, or between the joint flanges $3d_1$ and $3d_2$ of the rear pillar outer reinforcement 3B and the joint flanges $3f_1$ and $3f_2$ of the rear pillar inner reinforcement 3C.

Furthermore, in the area H, the front wall of the rear pillar outer reinforcement 3B (the oblique portion 3c) is opposed and jointed to the rear wall of the rear pillar inner reinforcement 3C. In a section where the rear joint flange $3f_2$ of the rear pillar inner reinforcement 3C is butt-jointed to the front joint flange $3d_1$ of the rear pillar outer reinforcement 3B, the joint flanges $3d_1$ and $3f_2$ as well as the joint flange 2a of the wheel house outer 2A are jointed to one another by spot welding with the joint flange 2a interposed between the joint flanges $3d_1$ and $3f_2$.

The inner extension 3D is formed to bulge toward the inside of the vehicle compartment, and includes: a main wall located on the outer side of the vehicle compartment (or on the outer side in the vehicle transverse direction); a front wall extending from a front edge of the main wall toward the outside of the vehicle compartment; and a rear wall extending from a rear edge of the main wall toward the inside of the vehicle compartment. The inner extension 3D has a hat-shaped cross section open to the outside of the vehicle compartment, and functions as an inner member of the rear pillar 3 (the C pillar). The front wall of the inner extension 3D is provided on one edge thereof on the outer side of the vehicle compartment (or on the outer side in the vehicle transverse direction), with a joint flange 3h extending forward from the edge. The rear wall of the inner extension 3D is provided on another edge thereof on the outer side of the vehicle compartment (or on the outer side in the vehicle transverse direction) with a joint flange 3h extending rearward from the edge. This inner extension 3D is formed to curve in the vehicle transverse direction, and is extended along an inner surface in the vehicle transverse direction of the joint flange 2a of the wheel house outer 2A and an inner surface in the vehicle transverse direction of the cover portion 2d of the wheel house inner 2B. Joint flanges 3h of the inner extension 3D are jointed to the joint flange 2a and the cover portion 2d. Thereby, the inner extension 3D together with the joint flange 2a and the cover portion 2d forms a closed section.

An upper end portion of this inner extension 3D is connected to a lower end portion of the rear pillar inner reinforcement 3C. A lower end portion of the inner extension 3D is connected to the upper wall 4a of the shock absorber upper supporting part 4 formed in the wheel house inner 2B. Thus, the rear pillar inner reinforcement 3C and the inner extension 3D cooperate to form an inner member of the rear pillar 3 extending in the vertical direction.

A door lock apparatus 6 (for example, a striker or the like) is provided on the outer surface of the joint flange 2a of the wheel house outer 2A in an area forward of the rear pillar outer reinforcement 3B, as shown in FIG. 1. On the other hand, a substantially rectangular opening 2e is formed on the inner surface of the joint flange 2a in an area rearward of the rear pillar inner reinforcement 3C. A seat belt retractor 5 is housed in this opening 2e. The opening 2e is arranged in a way that the opening 2e and the rear pillar outer reinforcement 3B overlap each other when projected in the vehicle transverse direction. In other words, the opening 2e is covered with the oblique portion 3c of the rear pillar outer reinforcement 3B from the outer side of the vehicle compartment or from the outer side in the vehicle transverse direction. Incidentally, the door lock apparatus 6 is fixed to a bracket 2f (see FIG. 2) formed by cutting and raising a part of the joint flange 2a.

In the case of the foregoing embodiment, the vehicle body structure is provided with the rear pillar 3 including: the rear pillar outer reinforcement 3B as the outer member which has the hat-shaped cross section open toward the inside of the vehicle compartment, and which extends substantially in the vertical direction; and the rear pillar inner reinforcement 3C and the inner extension 3D collectively as the inner member which has the hat-shaped cross section open to the outside of the vehicle compartment, and which extends substantially in the vertical direction. In the vehicle body structure, the lower portion of the rear pillar outer reinforcement 3B is arranged with the lower portion thereof shifted and located rearward of the lower portion of the rear pillar inner reinforcement 3C, and the front portion of the rear pillar outer reinforcement 3B is butt-jointed to the rear portion of the rear pillar inner reinforcement 3C. This makes it possible to secure the strength and rigidity of the rear pillar 3, and concurrently secure an area/space for arranging parts and the like forward of the rear pillar outer reinforcement 3B and rearward of the rear pillar inner reinforcement 3C. Accordingly, the vehicle body structure of the present embodiment secures the rigidity and strength of the rear pillar 3, and enables the rear pillar 3 to efficiently absorb the load inputted from the shock absorber, even under a condition where the parts such as the seat belt retractor 5 and the door lock apparatus 6 are set in the vicinity of the rear pillar 3.

In addition, the foregoing configuration enables to secure a large width of the lower portion of the rear pillar 3 in the vehicle longitudinal direction. This brings about an advantage that the vertical rigidity, and the torsional rigidity of the rear portion of the vehicle body is improved, and an advantage that riding comfort (damping feeling) is improved.

Moreover, the front joint flange $3d_1$ of the rear pillar outer reinforcement 3B overlaps in the vehicle transverse direction with and is butt-jointed to the rear joint flange $3f_2$ of the rear pillar inner reinforcement 3C. This facilitates joining a part of the lower portion of the rear pillar outer reinforcement 3B to a part of the lower portion of the rear pillar inner reinforcement 3C, which is shifted from the part of the lower portion of the rear pillar outer reinforcement 3B in the vehicle longitudinal direction.

Furthermore, in the lower portions of the respective rear pillar outer reinforcement 3B and the rear pillar inner reinforcement 3C (in the area H shown in FIGS. 1, 3 and 4), the closed sections are formed inside and outside the rear pillar 3 by joining the joint flanges $3d_1$ and $3f_2$ to the joint flange 2a of the wheel house outer 2A, and the rigidity and strength of the connection between the rear pillar 3 and the wheel house 2 is enhanced.

Particularly in the section where the joint flanges $3d_1$ and $3f_2$ overlap each other, the joint flanges $3d_1$ and $3f_2$ as well as the joint flange 2a of the wheel house outer 2A are welded to one another with the joint flange 2a interposed between the joint flanges $3d_1$ and $3f_2$. This contributes to decreasing the number of welding processes, and accordingly to shorten a manufacturing time and to cut back on manufacturing costs.

Moreover, in the case of the present embodiment, the lower end of the inner extension 3D as the inner member is connected to the shock absorber upper supporting part 4 provided on the wheel house inner 2B, and the inner extension 3D is curved forward to have the portion of the inner extension 3D below the central portion thereof extended substantially in the vertical direction. This enables the inner member to efficiently absorb the load inputted from the shock absorber, while securing the rigidity and strength of the rear pillar 3.

Additionally, in the case of the present embodiment, the joint flange 2a of the wheel house outer 2A overlaps the lower portions of the respective rear pillar outer reinforcement 3B and the rear pillar inner reinforcement 3C. Thereby, the closed section is formed in each of the lower portions of the respective rear pillar outer reinforcement 3B and the rear pillar inner reinforcement 3C. Hence, the rigidity and strength is secured for each of the lower portions. Concurrently, the door lock apparatus 6 is provided on the joint flange 2a in the area forward of the lower portion of the rear pillar outer reinforcement 3B. This makes it possible to arrange the door lock apparatus 6 in an adequate location while securing the rigidity and strength of the rear pillar 3.

In addition, the opening 2e is provided on the joint flange 2a in the area rearward of the lower portion of the rear pillar inner reinforcement 3C. The seat belt retractor 5 is housed in the opening 2e. This makes it possible to arrange the seat belt retractor 5 in an adequate location while securing the rigidity and strength of the rear pillar 3.

At this time, the seat belt retractor 5 housed in the opening 2e is covered with the rear pillar outer reinforcement 3B from the outer side of the vehicle compartment. This prevents noise outside the vehicle compartment from entering the vehicle compartment through the opening 2e for the seat belt retractor 5.

The preferred embodiments described herein are illustrative and not restrictive, and the invention may be practiced or embodied in other ways without departing from the spirit or essential character thereof. Although the vehicle body structure in which the rear pillar including the outer and inner members having their respective hat-shaped cross sections is extended to the upper portion of the wheel house has been shown in the present embodiment, the present invention can be applied to not only the rear pillar but also any other member having two components each having a hat-shaped cross section, for example. Moreover, although the lower portion of the rear pillar inner reinforcement 3C as the inner member is arranged forward of the lower portion of the rear pillar outer reinforcement 3B in the case of the foregoing embodiment, the two lower portions may be arranged the other way round. Specifically, the lower portion of the rear pillar outer reinforcement 3B may be arranged forward of the lower portion of the rear pillar inner reinforcement 3C.

Furthermore, in the case of the present embodiment, the joint flange 2a of the wheel house outer 2A is extended upward, so that the lower portions of the respective rear pillar outer reinforcement 3B and the rear pillar inner reinforcement 3C are jointed to the joint flange 2a. Instead, the joint flange 2b of the wheel house inner 2B may be extended upward so that the lower portions of the respective rear pillar outer reinforcement 3B and the rear pillar inner reinforcement 3C are jointed to the joint flange 2b. Otherwise, both of the joint flanges 2a and 2b may be extended upward so that the lower portions of the respective rear pillar outer reinforcement 3B and the rear pillar inner reinforcement 3C are jointed to the joint flanges 2a and 2b.

The scope of the invention being indicated by the claims, and all variations which come within the meaning of claims are intended to be embraced herein.

The present disclosure relates to subject matters contained in Japanese Patent Application No. 2006-189758, filed on Jul. 10, 2006, the disclosures of which is expressly incorporated herein by reference in its entirety.

What is claimed is:

1. A vehicle body structure comprising:
a first member including a main wall, a first side wall extending from the main wall on one side of the first member, and a second side wall extending from the main wall on the other side of the first member, wherein an opening is formed between the first and second side walls of the first member in a direction away from the main wall;
a second member including a main wall, a first side wall extending from the main wall on one side of the second member, and a second side wall extending from the main wall on the other side of the second member, wherein an opening is formed between the first and second side walls of the second member in a direction away from the main wall;
an opposing area in which the opening, first side wall and second side wall of the first member are opposed to and jointed to the opening, first side wall and second side wall of the second member, respectively, with a joint surface defined therebetween; and
a non-opposing area in which one of the first and second members is shifted in a direction substantially parallel to the joint surface, and in which the first side wall of the first member is opposed to and jointed to the second side wall of the second member.

2. The vehicle body structure according to claim 1, wherein the first and second members extend substantially in a vertical direction, wherein the non-opposing area is located below the opposing area, and wherein the joint surface extends in a longitudinal direction of the vehicle.

3. The vehicle body structure according to claim 2, wherein, in the non-opposing area, a joint flange provided on the first side wall of the first member is butt-jointed to a joint flange provided on the second side wall of the second member.

4. The vehicle body structure according to claim 2, wherein a lower end of one of the first and second members is connected to a shock absorber upper supporting part provided on a wheel house for supporting an upper portion of a shock absorber.

5. The vehicle body structure according to claim 2, wherein, in the non-opposing area, the first member is arranged rearward of the second member, wherein lower portions of the respective first and second members overlap a joint flange of one of a wheel house outer portion and a wheel house inner portion, and wherein a door lock apparatus is provided on the joint flange in an area forward of the first member.

6. The vehicle body structure according to claim 2, wherein, in the non-opposing area, the first member is arranged rearward of the second member, wherein lower portions of the respective first and second members overlap a joint flange of one of a wheel house outer portion and a wheel house inner portion, wherein an opening is provided on the joint flange in an area rearward of the second member, and wherein a seat belt retractor is housed in the opening of the joint flange.

7. The vehicle body structure according to claim 6, wherein the seat belt retractor housed in the opening of the joint flange is covered with the first member.

8. A rear vehicle body structure comprising:
a wheel house including a wheel house outer portion and a wheel house inner portion; and
a rear pillar extended to the wheel house, the rear pillar including an outer member having a main wall, a first side wall extending from the main wall on one side of the outer member, and a second side wall extending from the main wall on the other side of the outer member, wherein an opening is formed between the first and second side walls of the outer member and is open toward an inside of a vehicle compartment, and an inner member having a main wall, a first side wall extending from the main wall on one side of the inner member, and a second side wall extending from the main wall on the other side of the inner member, wherein an opening is formed between the first and second side walls of the inner member and is open toward an outside of the vehicle compartment, with a joint surface defined between the outer and inner members,
wherein one of lower portions of the respective outer and inner members is shifted in a direction substantially parallel to the joint surface, and a front portion of the shifted one of the lower portions is butt-jointed to a rear portion of the other of the lower portions, and wherein a lower end of the inner member is connected to a shock absorber upper supporting part provided on the wheel house inner portion for supporting an upper portion of a shock absorber.

9. The rear vehicle body structure according to claim 8, wherein the lower portion of the outer member is shifted and located rearward of the lower portion of the inner member, and the front portion of the lower portion of the outer member is butt-jointed to the rear portion of the lower portion of the inner member.

10. The rear vehicle body structure according to claim 9, wherein the front portion comprises a front joint flange, the rear portion comprises a rear joint flange, and the front joint flange and the rear joint flange are butt-jointed to each other.

11. The rear vehicle body structure according to claim 9, wherein a joint flange of one of the wheel house outer portion and the wheel house inner portion overlaps the lower portions of the respective outer and inner members, and a door lock apparatus is provided on the joint flange in an area forward of the outer member.

12. The rear vehicle body structure according to claim 9, wherein a joint flange of one of the wheel house outer portion and the wheel house inner portion overlaps the lower portions of the respective outer and inner members, wherein an opening is provided on the joint flange in an area rearward of the inner member, and wherein a seat belt retractor is housed in the opening of the joint flange.

13. The rear vehicle body structure according to claim 12, wherein the seat belt retractor housed in the opening of the joint flange is covered with the outer member from the outside of the vehicle compartment.

14. The vehicle body structure according to claim 1, wherein the main wall, the first side wall, and the second side wall of the first member form a flat-bottomed U-shaped cross section; and wherein the main wall, the first side wall, and the second side wall of the second member form a flat-bottomed U-shaped cross section.

15. The rear vehicle body structure according to claim 8, wherein the main wall, the first side wall, and the second side wall of the outer member form a flat-bottomed U-shaped cross section; and wherein the main wall, the first side wall, and the second side wall of the inner member form a flat-bottomed U-shaped cross section.

* * * * *